United States Patent
Knudsen et al.

(10) Patent No.: US 11,013,233 B2
(45) Date of Patent: May 25, 2021

(54) COMPOSITION AND METHOD FOR ATTRACTING BED BUGS

(71) Applicant: NATTARO LABS AB, Lund (SE)

(72) Inventors: Jette Knudsen, Höör (SE); Magnus Bäckmark, Södra Sandby (SE)

(73) Assignee: NATTARO LABS AB, Lund (SE)

( * ) Notice: Subject to any disclaimer, the term of this patent is extended or adjusted under 35 U.S.C. 154(b) by 0 days.

(21) Appl. No.: 16/468,263

(22) PCT Filed: Nov. 30, 2017

(86) PCT No.: PCT/EP2017/081026
§ 371 (c)(1),
(2) Date: Jun. 10, 2019

(87) PCT Pub. No.: WO2018/114273
PCT Pub. Date: Jun. 28, 2018

(65) Prior Publication Data
US 2020/0068883 A1     Mar. 5, 2020

(30) Foreign Application Priority Data
Dec. 20, 2016 (EP) .................................... 16205486

(51) Int. Cl.
*A01N 35/02* (2006.01)
*A01M 1/02* (2006.01)
*A01N 25/18* (2006.01)
*A01N 37/06* (2006.01)

(52) U.S. Cl.
CPC ............ *A01N 35/02* (2013.01); *A01M 1/026* (2013.01); *A01N 25/18* (2013.01); *A01N 37/06* (2013.01)

(58) Field of Classification Search
None
See application file for complete search history.

(56) References Cited

U.S. PATENT DOCUMENTS

| | | | |
|---|---|---|---|
| 7,892,528 B2 | 2/2011 | Siljander et al. | |
| 2011/0293553 A1* | 12/2011 | Wu | A01N 25/00 424/84 |
| 2012/0171313 A1 | 7/2012 | Boone | |
| 2016/0316750 A1 | 11/2016 | Gries et al. | |

FOREIGN PATENT DOCUMENTS

| | | | |
|---|---|---|---|
| JP | 2000228938 A | * | 8/2000 |
| WO | WO 2010/105029 A2 | | 9/2010 |
| WO | WO 2011/149901 A1 | | 12/2011 |
| WO | WO 2015/089661 A1 | | 6/2015 |

OTHER PUBLICATIONS

Pearson, "Building a Better Bed Bug Trap", electronic article obtained from wired.com. Publication date of Dec. 29, 2014. Retrieved on Feb. 3, 2020. Retrieved from URL: https://www.wired.com/2014/12/building-a-better-bed-bug-trap/ (Year: 2014).*
Mendki, "Aggregation responses of Cimex hemipterus F. to semiochemicals identified from their excreta", J Vector Borne Dis 51, Sep. 2014, pp. 224-229 (Year: 2014).*
English translation of JP 2000228938A (Fujita) obtained from EPO (Year: 2020).*
Gries et al., "Bed Bug Aggregation Pheromone Finally Identified", Angewandte Chemie International Edition, 2015, 54: 1135-1138.

* cited by examiner

*Primary Examiner* — Robert T. Crow
*Assistant Examiner* — John P Nguyen
(74) *Attorney, Agent, or Firm* — James S. Keddie; Bozicevic, Field & Francis LLP

(57) ABSTRACT

A composition for attracting bed bugs, the composition comprising the five compounds (E)-2-hexenal, (E)-2-hexenoic acid, (E)-2-octenal, 2-octenoic acid and 2-hexanone, a trap comprising these five compounds and methods of attracting and detecting bed bugsusing the five compounds, are disclosed.

20 Claims, No Drawings

COMPOSITION AND METHOD FOR ATTRACTING BED BUGS

CROSS-REFERENCE TO RELATED APPLICATIONS

This application is a § 371 national phase of International Application No. PCT/EP2017/081026, filed on Nov. 30, 2017, which claims the benefit of European Patent Application No. 16205486.0, filed on Dec. 20, 2016, which applications are incorporated by reference herein.

FIELD OF THE INVENTION

The present invention relates to the field of compositions for attracting bed bugs, in order to inter alia capture or detect bedbugs. In particular the present invention relates to a composition comprising (E)-2-hexenal, (E)-2-hexenoic acid, (E)-2-octenal, 2-octenoic acid and 2-hexanone, and a method of using the composition for attracting or detecting bed bugs.

BACKGROUND OF THE INVENTION

Insect infestation of human habitats has been on the increase in recent years. One reason for this increase is the development of resistant insect species that are virtually immune to prevalent extermination methods. By way of example, the population of bed bugs, having been almost eradicated in the developed world in the 1940s, has slowly been recovering since then. Moreover, the recovery has accelerated since mid-1990s.

Bed bugs (Cimex lectularius, Cimex hemipterus) are wingless insects with exoskeleton, the size and shape of an apple seed. They favor tight and dark spaces. Consequently, they prefer to hide in beds and crevices and cracks in floor/walls and behind skirting-boards. They feed on blood, are active at night and bite any areas of exposed skin. A number of adverse health effects may occur due to bed bug bites, including skin rashes, allergic reactions and/or mental distress. Obviously, above-mentioned rise in population has contributed to increase in bed bug bites and related conditions.

Several methods of combatting insect infestation in general and that of bed bugs in particular, are known in the art.

One way to address said problem is to subject, for a determined period of time, the infested area to a temperature, either high or low, that is injurious to bed bugs. Accordingly, to kill adult bedbugs as well as laid eggs, said area needs to be heated to 60° C. for one hour or be kept below −18° C. for at least 48 hours.

Another frequently used method for combatting bed bugs is to spread diatomaceous earth (DE) in powder form on the floor and/or along or behind skirting-boards of the room. Once the bed bug comes into contact with DE, substantially needle-shaped, micrometer-sized pieces of DE absorb the wax layer on the bed bugs. This starts an irreversible dehydrating process in the bed bug eventually leading to its death. This method may also be used in combatting other insects having similar properties and behavioral patterns.

Still other methods propose the use of different kinds of traps designed to trap bed bugs.

In common for all these methods is however the need for attracting the bud bugs to the trap or DE, or in any case the need for detecting bed bugs prior to starting combatting the bed bugs, or for detecting any remaining bed bugs after extermination attempts.

U.S. patent application Ser. No. 15/10,676 discloses a composition for attracting and/or arresting bed bugs. The compound comprises at least histamine or dimethyl disulfide and dimethyl trisulfide. The compound typically further comprises (E)-2-hexenal, (E)-2-octenal and 2-hexanone.

U.S. Pat. No. 7,892,528 discloses methods of attracting bed bugs using a composition comprising nonanal, decanal, (E)-2-hexanal, (E)-2-octenal, (E,E)-2,4-octadienal, benzaldehyde, benzyl alcohol, (+)-limonene, (−)-limonene and sulcatone.

International patent application PCT/US2011/037688 discloses methods of attracting bed bugs using for example 2-hexanone in combination with (E)-2-hexenal or (E)-2-octenal.

Gries et al: "bed Bug Aggregation Pheromone Finally Identified", Angewandte Chemie Internatiioal Edition vol 54, no. 4, discloses a composition comprising (E)-2-hexenal, (E)-2-octenal and 2-hexanone.

International patent application PCT/US2010/026938 discloses a composition comprising (E)-trans)-2-hexenal and (E)-(trans)-2-octenal.

U.S. patent application Ser. No. 13/335,389 discloses a pesticide comprising Neem oil.

Despite these recent advancements there is still a need for further compositions and methods of attracting bed bugs to allow their detection and/or eradication.

Accordingly, it is an object of the present invention to provide a composition for attracting bed bugs.

It is a further object of the present invention to provide a composition for attracting bed bugs, which composition may be used in various methods of attracting bed bugs.

It is yet a further object of the present invention to provide a composition which may be formulated in different forms.

It is still a further object of the present invention to provide a trap for bed bugs, which trap utilizes the composition for attracting bed bugs.

It is still a further object of the present invention to provide methods for attracting and or detecting bed bugs using the composition or the trap.

SUMMARY OF THE INVENTION

At least one of the above objects, or at least one of the objects which will be evident from the below description, is according to a first aspect of the invention achieved by a composition for attracting bed bugs, wherein the composition comprises (E)-2-hexenal, (E)-2-hexenoic acid, (E)-2-octenal, 2-octenoic acid and 2-hexanone. Thus the present invention is based on the discovery that these five compounds together strongly attracts bed bugs, as evidenced in the example section further below. Accordingly the composition can be used to attract bed bugs with the intent of for example luring the bed bugs into a trap, and/or with the intent of causing the bed bugs to reveal themselves, thereby allowing an infestation of bed bugs to be detected.

At least one of the above objects, or at least one of the objects which will be evident from the below description, is according to a second aspect of the present invention achieved by a trap for trapping bed bugs, the trap comprising the composition according to the first aspect of the present invention for attracting the bed bugs.

At least one of the above objects, or at least one of the objects which will be evident from the below description, is according to a third aspect of the invention further achieved by a method of attracting bed bugs comprising the step of positioning a portion of the composition according to the first aspect of the present invention or the trap according to the second aspect of the present invention in a locale where bed bugs are suspected of being present.

At least one of the above objects, or at least one of the objects which will be evident from the below description, is according to a fourth aspect of the invention further achieved by a method of detecting bed bugs comprising the step of positioning a portion of the composition according to the first aspect of the present invention or the trap according to the second aspect of the present invention in a locale where bed bugs are suspected of being present.

DETAILED DESCRIPTION

The first aspect of the present invention relates to a composition for attracting bed bugs, wherein the composition comprises (E)-2-hexenal, (E)-2-hexenoic acid, (E)-2-octenal, 2-octenoic acid and 2-hexanone.

Thus the present invention is based on the discovery that these five compounds together strongly attracts bed bugs, as evidenced in the example section further below. Accordingly the composition can be used to attract bed bugs with the intent of for example luring the bed bugs into a trap, and/or with the intent of causing the bed bugs to reveal themselves, thereby allowing an infestation of bed bugs to be detected.

The composition according to the first aspect of the present invention may be an attractant, i.e. a bed bug attractant. The composition is capable of attracting bed bugs.

Thus the first aspect of the present invention may thus alternatively be seen as a bed bug attractant comprising (E)-2-hexenal, (E)-2-hexenoic acid, (E)-2-octenal, 2-octenoic acid and 2-hexanone.

In addition to attracting bed bugs the composition according to the first aspect of the present invention may also be capable of arresting bed bugs, i.e. causing the bed bugs to remain in proximity to the composition. Thus the composition according to the first aspect of the present invention may be capable of both attracting bed bugs, i.e. cause the bed bugs to move towards the composition, and arresting the bed bugs, i.e. causing the bed bugs to stay, once they have moved into proximity of the composition.

Any reference to the five compounds is to be understood as referring to (E)-2-hexenal, (E)-2-hexenoic acid, (E)-2-octenal, 2-octenoic acid and 2-hexanone.

The bed bug may typically be *Cimex lectularius* or *Cimex hemipterus*.

It is contemplated within the context of the present invention, that some embodiments of the composition could further include the (Z)-isomers of (E)-2-hexenal and (E)-2-octenal.

In the preferred embodiment of the composition according to the first aspect of the present invention the composition comprises 0.5 to 2 parts, such as 1 part (E)-2-hexenal, 2 to 5 parts (E)-2-hexenoic acid, 0.5 to 2 parts, such as 1 part (E)-2-octenal, 1 to 10 parts 2-octenoic acid and 0.5 to 2 parts, such as 1 part 2-hexanone.

More preferably the composition comprises 1 part of each of the five compounds.

These proportions of the five compounds have been shown to be effective in attracting bed bugs, see the example section.

In the preferred embodiment of the composition according to the first aspect of the present invention the composition comprises no other volatile components than (E)-2-hexenal, (E)-2-hexenoic acid, (E)-2-octenal, 2-octenoic acid and 2-hexanone.

Volatile components may be understood as chemical compounds with high vapour pressure at normal room temperature (20° C.), such as any organic compound having an initial boiling point less than or equal to 250° C. (482° F.) measured at a standard atmospheric pressure of 101.3 kPa.

This can alternatively be expressed as that (E)-2-hexenal, (E)-2-hexenoic acid, (E)-2-octenal, 2-octenoic acid and 2-hexanone are the only volatile components in the composition.

Preferably the composition does not contain at least one, more preferably none of, of 4-oxo-(E)-2-hexenal, 4-oxo-(E)-2-octenal, limonene, benzaldehyde, sulcatone, octanal, nonanal, decanal, dimethyl sulfide, dimethyl trisulfide and 1-octen-3-ol.

More preferably the composition does not comprise 4-Oxo-(E)-2-hexenal and 4-oxo-(E)-2-octenal, as these compounds were identified as having no attractive effect, rather as having a repulsive effect, in the Arena tests, see example 2.

Preferably the composition should not contain any anti-oxidant, such as ascorbic acid. This is because it was found that ascorbic acid, a common anti-oxidant, decreased the shelf-life of the composition.

In one specific embodiment the composition according to the first aspect of the present invention consists of (E)-2-hexenal, (E)-2-hexenoic acid, (E)-2-octenal, 2-octenoic acid and 2-hexanone.

In the preferred embodiment of the composition according the first aspect of the present invention the composition further comprises a carrier. This makes the composition easier to administer and handle. The carrier may comprise a solid, liquid or a gel. The composition may thus be formulated as a liquid, a gel, a solid (such as a tablet or pellet).

In the preferred embodiment of the composition according the first aspect of the present invention the carrier is selected from the group consisting of gelatine and polyethylene glycol (PEG), a superabsorbent polymer such as sodium polyacrylate, a mineral oil, paraffin and water.

Gelatine and polyethylene glycols (PEG) are preferred carriers because they are easy and cheap to use, and because test results, see example 2 and 4, have shown that these carriers allow the five compounds to be released, i.e. vaporised, at a rate suitable for providing a composition for attracting bed bugs which can be used for a sufficiently long time (such as at least 24 h, such as at least 72 h, such as 24-144 h, such as preferably up to 3 weeks) to efficiently attract bed bugs. The composition including the carrier may further be shaped and dimensioned, such as being moulded, to affect the rate at which the five compounds are released/vaporised from the carrier. To obtain a higher rate of release the composition may be formed into pellets providing a high specific surface per weight of the composition. To obtain the opposite, i.e. slow release, the composition may be formed into larger portions or parts. The composition may further be covered by a coating to further decrease the rate of release of the five compounds.

The PEG may have a molecular weights between 400 up to 9500, and appear as a liquid (molecular weight below 700), a semi solid (molecular weight between 700 and 900) and as a waxy solid flake or powder (molecular weight above 1000).

In the preferred embodiment of the composition according the first aspect of the present invention the carrier comprises, or consists of, PEG 4000 (CAS #25322-68-3, average molecular weight between 3600 and 4400).

This polyethylene glycol may, dependent on the final shape of the carrier, provide a rate of release sufficient to render the composition effective for up to 2 weeks, dependent on the amount of the composition and the shape of the composition. Further PEG 4000 is solid at room temperature and thus very easy to handle and form.

In one specific embodiment of the composition according to the first aspect of the present invention the composition consists of a carrier as described above and (E)-2-hexenal, (E)-2-hexenoic acid, (E)-2-octenal, 2-octenoic acid and 2-hexanone.

As shown in the example section, effective compositions need not contain further compounds.

In some embodiments of the composition according to the first aspect of the present invention the composition comprises 50 to 600 mg/l, such as 100-300 mg/l (E)-2-hexenal, 100-1500 mg/l (E)-2-hexenoic acid, 50 to 600 mg/l, such as 100-300 mg/l (E)-2-octenal, 100-3000 mg/l 2-octenoic acid, and 50 to 600 mg/l, such as 100-300 mg/l 2-hexanone, based on the total volume of the composition.

In these embodiments the composition preferably comprises a carrier as described above.

More preferably the composition comprises 100 mg/l of each of the five compounds.

In some embodiments the composition comprises 10-300 mg/l (E)-2-hexenal, 20-1500 mg/l (E)-2-hexenoic acid, 10-300 mg/l (E)-2-octenal, 10-3000 mg/l 2-octenoic acid, and 10-300 mg/l 2-hexanone, based on the total volume of the composition.

In some embodiments of the composition according to the first aspect of the present invention, a dose of the composition comprises 0.1 to 100 g, such as 0.5 to 10 g, such as 0.5 to 3.5 g of the composition, or alternatively, a dose of the composition comprises 0.1 to 100 ml, such as 0.5 to 10 ml, such as 0.5 to 3.5 ml of the composition.

As shown in the example section, where baits, i.e. doses, of the composition have weights of inter alia 0.9 g, these doses are capable of attracting bed bugs. Larger doses provide a larger amount of the five compounds for attracting bed bugs for a longer time.

In these embodiments the composition preferably comprises a carrier as described above.

A dose of the composition is to be understood as encompassing a portion of the composition, i.e. a bait. The term lure may also be used for a dose or portion of the composition. The size of a dose depends inter alia on for how long the dose should be effective in attracting bed bugs, the size of the locale where the dose is placed, and the temperature in the locale. A suitable dose can be selected by placing different doses in the locale where bed bugs should be attracted and identifying the dose that attracted bed bugs with the desired efficiency and duration.

In some embodiments of the composition according to the first aspect of the present invention the volatiles given off by the composition, preferably by a dose of the composition, at a temperature of 20° C. and at a standard atmospheric pressure of 101.3 kPa comprises 0.001 to 37.4% (E)-2-hexenal, 0.01 to 2.2% (E)-2-hexenoic acid, 40.4 to 90.9% (E)-2-octenal, 0.001 to 2.8% 2-octenoic acid and 5.9 to 39.8% 2-hexanone, wherein the sum of the percentages is less than, or equal to, 100%.

Preferably the sum of the percentages is equal to 100%, i.e. no other volatiles are given off by the composition under these conditions Alternatively the proportion of the five compounds given off by the composition, preferably by a dose of the composition, at a temperature of 20° C. and at a standard atmospheric pressure of 101.3 kPa is 0.001 to 37.4% (E)-2-hexenal, 0.01 to 2.2% (E)-2-hexenoic acid, 40.4 to 90.9% (E)-2-octenal, 0.001 to 2.8% 2-octenoic acid and 5.9 to 39.8% 2-hexanone, wherein the sum of the percentages is equal to, 100%.

These values are based on the min and max values of the proportion of the five compounds as measured in Example 1 and 4. The volatiles given off by the composition may for example be measured by placing a portion or dose of the composition in a container under the conditions above and collecting the headspace from the container and determining the make up of the head space by Gas chromatography-Mass spectroscopy (GC-MS). The head space should be collected 240 hours after the portion or dose is placed in the container. The headspace may be analysed using a gas chromatograph (GC, Hewlett-Packard 6890 Series) equipped with a polar capillary column (Innowax; 30 m long, 0.25 mm i.d. and film thickness 0.25 µm Agilent Technologies USA) coupled to a mass spectrometer (Hewlett-Packard 5973 Mass Selective Detector). The injector temperature may be 225° C. and the injection splitless. The GC temperature should programmed for 2 min at 40° C. followed by a gradual increase of 8°/min to 225° C., where the temperature was held steady for five min.

In one specific embodiment of the composition according to the first aspect of the present invention the composition further comprises an insecticide.

The insecticide may for example comprise pyrethrins, pyrethroids desiccants (such as diatomaceous earth (DE)), biochemical insecticides (such as cold pressed neem oil), pyrroles (chlorfenapyr), neonicotinoids, and insect growth regulators.

The second aspect of the present invention relates to a trap for catching bed bugs, wherein the trap comprises or contains (E)-2-hexenal, (E)-2-hexenoic acid, (E)-2-octenal, 2-octenoic acid and 2-hexanone, preferably provided as the composition according to the first aspect of the present invention.

The trap may for example be constructed as in the applicant's international patent application WO2013115719. Alternatively, the trap may be of the pit-fall type comprising a cone-shaped body with an entrance at the top and the composition according to the first aspect of the present invention placed inside, thus causing the bed bugs to climb up the outside of the cone and fall into the interior of the cone through the entrance.

The composition according to the first aspect of the present invention may be used for attracting bed bugs.

Thus the third aspect of the present invention relates to a method of attracting bed bugs, comprising the step of:

i) positioning (E)-2-hexenal, (E)-2-hexenoic acid, (E)-2-octenal, 2-octenoic acid and 2-hexanone in a locale where bed bugs are present.

Positioning the five compounds in the locale will attract bed bugs to move towards the five compounds. This allows the bed bugs to be captured and/or exterminated.

The five compounds may be separate from each other, for example as five different compositions each for example comprising a carrier and one of the five compounds. Alternatively, two or more of the compounds may be combined in a single composition.

Preferably however the five compounds are provided as the composition according to the first aspect of the present invention, or as the trap according to the second aspect of the present invention.

The fourth aspect of the present invention relates to a method of detecting bed bugs, comprising the step of i) positioning (E)-2-hexenal, (E)-2-hexenoic acid, (E)-2-octenal, 2-octenoic acid and 2-hexanone in a locale where bed bugs are suspected of being present.

The five compounds may be separate from each other, for example as five different compositions each for example comprising a carrier and one of the five compounds. Alternatively, two or more of the compounds may be combined in a single composition.

Preferably however the five compounds are provided as the composition according to the first aspect of the present invention, or as the trap according to the second aspect of the present invention.

Thus not only can the composition and the trap according to the first and second aspects of the present invention be used for attracting bed bugs in locales where bed bugs are present, additionally the composition and trap can be used for detecting, i.e. attracting any bed bugs that are present, whether bed bugs are present.

The locale may be a bed, a room, an apartment, a house a vehicle, a suitcase, or any other location where bed bugs are present or suspected of being present.

Where the five compounds are provided as the composition according to the first aspect of the present invention, a portion of the composition may be positioned. The five compounds, the composition, the portion of the composition or the trap may be positioned in the locale for 0-24 hours, 0-72 hours, 0-144 hours or even up to three weeks.

Multiple portions of the composition, or multiple traps, may be placed in the locale.

Attracting bed bugs may comprise causing bed bugs to move toward the composition or the trap.

Detecting bed bugs may comprise observing bed bugs captured in the trap, or otherwise observing bed bugs, such as in the proximity of the composition or trap.

Attracting and detecting bed bugs need not encompass detecting or attracting all bed bugs present, rather it is enough if at least one bed bug is attracted or detected.

EXAMPLES

Example 1

Headspace Collection of Volatiles from Bed Bug Populations

In this test volatile compounds were collected from the headspace of test enclosures housing bed bugs. A number of potential test compounds were identified for further testing in the Arena tests, see example 2.

1.1. Material and Methods

Bed bugs used in replicate I and III originated exclusively from Nattaro's lab culture fed on sheep blood, whereas replicate II, IV and V contained adults fed on human blood from R. Naylor, Cimex store, UK, and 1th and 2nd instar nymphs from Nattaro's culture.

60 ml plastic containers with screw on lids were modified by boring holes, 1.8 cm in diam, at the bottom and in the lid. To avoid that bed bugs escaped fine-mesh plastic netting, that allowed air passage through the container, were glued over the holes. Each container was equipped with a 45×80 mm filter paper folded several times to fit in the container. A replicate consisted of six containers: five with 6, 12, 18, 24 or 48 recently fed nymphs (1th and 2nd instars), male and female bed bugs and one container being a control with no insects in.

To passively collect (enfleurage through out the paper) the emissions from each container an additional net was fitted over the opening onto which an adsorbent was placed.

Enfleurage Samples

All six containers of a replicate were kept together and treated equally. After installation of the bed bugs and addition of adsorbent for enfleurage collection the bed bugs were left undisturbed in a climatic chamber at 25° C. at a daily light/dark cycle of 8/16 h. After 6, 7 or 8 days each replicate was taken to the lab and the lid was removed. With a battery driven pump the adsorbent was sucked up in a Teflon tube equipped with a glass wool stopper at the end towards the pump. When the adsorbent was in the Teflon tube another glass wool stopper was inserted in the other end and the sample was ready for extraction.

Dynamic Headspace Samples

After collection of the enfleurage samples head-space collections were made from each container using a special lid into which an adsorbent plug was inserted. The head-space of all containers in a replicate was collected simultaneously under dark conditions (except the first samples of replicate one) using battery operated membrane pumps. The air-flow through each container was adjusted to 35-40 ml/min. The head-space samples were collected for 2 hours for replicate one to three after the first week, but was extended to 4-6 hours for replicate 4 & 5 and for all replicates and collections after the second week. This was done to secure more material as the first samples were very weak.

Tenax GR (mesh size 60-80 Alltech, USA) was used as adsorbent for both head space and enfleurage collections. Prior to use all adsorbents were cleaned with methanol, acetone and hexane in excess. For enfleurage 60 mg was used to collect emissions during the first week after start of the experiment, followed by 40 mg during the second and third week. Each plug was eluted with 400 µl high grade hexane. Head space samples were collected after one week and again after two weeks since the initiation of the experiment using 10 mg adsorbent plugs. Head-space plugs were eluted with 250 µl of high grade hexane.

Analysis

Samples were eluted within 24 hours of collection, most samples immediately after collection. For quantification purposes 50 ng of methyl stearate was added as internal standard to all samples. All samples were concentrated at room temperature until between 20 and 50 µl remained before analyses.

The samples were analyzed on a gas chromatograph (GC, Hewlett-Packard 6890 Series) equipped with a polar capillary column (Innowax; 30 m long, 0.25 mm i.d. and film thickness 0.25 µm Agilent Technologies USA) coupled to a mass spectrometer (Hewlett-Packard 5973 Mass Selective Detector). The injector temperature was 225° C. and the injection splitless. The GC temperature was programmed for 2 min at 40° C. followed by a gradual increase of 8°/min to 225° C., where the temperature was held steady for five min. Compounds were identified against the spectra and retention times of authentic reference compounds or in a few cases against the spectral libraries of ADAM and NIST2011.

Most compounds were quantified manually using the contribution of major and characteristic ions and to obtain an approximation of amounts of individual compounds their areas were compared with that of the added internal standard.

1.2. Results

All samples collected from containers containing bed bugs in a replicate were compared to the control sample of that replicate. Compounds occurring in similar amounts as in the control sample were judged as background contaminations, where as those that in any sample occurred in more than five times the amounts of that of control samples were suggested to originate from the bed bugs. The emissions varied between the different replicates: usually replicate II and V emitted the most followed by replicate IV. Replicate I and III always emitted the smallest amount of volatiles. During the first week at density 12, the emissions from four of the five replicates were high and less variable than at other densities during week 1.

(E)-2-Octenal was present in all samples and (E)-2-hexenal in most samples containing bed bugs, and their corresponding (Z)-isomers were detected in the stronger samples. 4-Oxo-(E)-2-octenal and 4-oxo-(E)-2-hexenal were detected in most samples with higher densities of bed bugs, as was true for (E)-2-octenoic and (E)-2-hexenoic acid, while (E)-2-octen-1-ol only was detected in samples with very high amounts of volatiles. Several other compounds were detected in amounts equal to that found in control samples. One of these is 2-hexanone.

Table 1 below shows the relative (%) emissions from bed bugs kept at different densities. The emissions were collected passively through enfleurage for three weeks. After each week, during three weeks (W1, W2, W3), the adsorbent on top of each experimental container was collected and replaced with clean adsorbent. The control without bed bugs was kept in the same container as the samples all through the experiment.

TABLE 1

Relative emissions from bed bugs (%).

| Density | | 6 × 3 | 12 × 3 | 18 × 3 | 24 × 3 | 48 × 3 | Control |
|---|---|---|---|---|---|---|---|
| Total amount | W1 | 31.2 | 38.4 | 30.6 | 26.2 | 20.5 | |
| (ng/bed | W2 | 31.5 | 8.5 | 16.3 | 20.0 | 9.7 | |
| bug/week) | W3 | 12.8 | 8.2 | 6.3 | 18.5 | 7.9 | |
| Total amount | W1 | 80.1 | 197.7 | 236.2 | 269.1 | 422.6 | 28.71 |
| (ng/day/density) | W2 | 80.9 | 44.0 | 131.4 | 205.9 | 199.5 | 16.9 |
| Compound | W3 | 32.8 | 42.1 | 48.4 | 190.5 | 162.6 | 13.4 |
| a*. (Z)- & | W1 | 18.0 | 16.7 | 13.4 | 15.0 | 13.7 | 21.0 |
| (E)-2-Hexenal | W2 | 10.5 | 12.4 | 9.1 | 14.0 | 9.5 | 15.1 |
| | W3 | 8.7 | 7.4 | 4.7 | 8.0 | 4.7 | 7.8 |
| b*. ((Z)- & | W1 | 77.0 | 78.5 | 82.7 | 78.5 | 80.1 | 68.5 |
| (E)-2-Octenal | W2 | 86.4 | 86.5 | 88.2 | 81.5 | 86.4 | 77.8 |
| | W3 | 82.8 | 87.3 | 89.4 | 88.1 | 90.5 | 82.8 |
| c*. 4-Oxo-(E)- | W1 | 0.51 | 0.73 | 0.89 | 0.83 | 0.43 | 2.4 |
| 2-hexenal | W2 | 0.88 | 0.085 | 0.51 | 0.42 | 0.33 | 1.4 |
| | W3 | 1.5 | 0.85 | 1.2 | 0.36 | 0.71 | 1.7 |
| h*. (E)-2- | W1 | 0 | 0 | 0.21 | 2.4 | 3.6 | 0.02 |
| Octen-1-ol | W2 | 0 | 0 | 0.054 | 0.71 | 0.81 | 0 |
| | W3 | 0 | 0 | 0 | 0.34 | 0.55 | 0 |
| d*. 4-Oxo-(E)- | W1 | 3.2 | 3.1 | 1.8 | 1.8 | 1.6 | 5.4 |
| 2-octenal | W2 | 2.0 | 0.50 | 1.7 | 2.6 | 2.2 | 3.5 |
| | W3 | 5.2 | 3.8 | 3.6 | 2.0 | 2.2 | 5.7 |
| e*. (E)- | W1 | 0.59 | 0.37 | 0.34 | 0.69 | 0.27 | 1.5 |
| Hexenoic acid | W2 | 0.20 | 0.30 | 0.21 | 0.39 | 0.37 | 1.3 |
| | W3 | 0.63 | 0.39 | 0.52 | 0.42 | 0.39 | 1.1 |
| f*. (E)-2- | W1 | 0.77 | 0.59 | 0.66 | 0.81 | 0.44 | 1.2 |
| Octenoic acid | W2 | 0.14 | 0.14 | 0.21 | 0.33 | 0.42 | 0.83 |
| | W3 | 1.2 | 0.29 | 0.54 | 0.81 | 0.92 | 0.92 |

*The compounds in table 1 were initially assigned preliminary designations a*, b* and so on, see the table. For reasons described below the test compounds selected for the Arena tests described in Example 2 in some cases differed from the compounds in table 1. Thus, the actual test compounds have been assigned corresponding designations, however without *.

Based on table 1, a number of test compounds were selected for Arena tests, as described in Example 2 below.

Example 2

Arena Tests for Determining Desired Contents of Composition for Attracting Bed Bugs In these tests bed bugs were placed in an arena and allowed to freely move around while the movement patterns were recorded, including in particular the time that bed bugs spent in proximity to each of the three different stations, each station comprising a bait (test compound) or control.

2.1. Material and Methods

The Arena

The arena comprised a round (52 cm diameter) white painted metal tray with a 3.8 cm high rim. Evenly spaced half way between centrum and periphery three holes (3.4 cm diam) were bored. To prevent bed bug escape the rim was painted with Insect-a-Slip (#2871C Fluon, BioQuip Products, Inc. 2321 E, Chadwick St., Rancho Dominguez, Calif. 90220) resulting in a non-porous slippery, surface at the rim of the tray.

Three plastic containers (34 mm diam×7 cm high), each with a net covered hole (18 mm diam) at the bottom to allow airflow, were attached below the holes at the underside of the arena using clay dough. At the start of an experiment the compounds/baits and controls were placed one in each container below the arena. Usually one (scented) bait and two controls were used, but at some instants two scented baits were tested together, but then only one control was used in the experiments.

Above each container a round convex glass sheet was placed (6.8 cm in diam). Each glass sheet rested on top of two plastic crosses elevating them c 3 mm above the surface of the arena. The glass sheet was numbered according to the bait below it.

Test Compounds The following test compounds were used (based on the results from the collection of volatiles from Example 1)
a. (E)-2-hexenal
b. (E)-2-octenal
e. (E)-2-hexenoic acid
f. 2-Octenoic acid
g. 2-Hexanone As regards a and b, Example 1 shows that both (E)- and (Z)-isomers were found in as volatiles from the bed bugs, however only the (E)-isomer was chosen for Arena tests.

As regards f, Example 1 showed that the (E)-isomer was found. However, for the Arena tests a commercially available mixture of both isomers was used.

Example 1 further identified (E)-2-octen-1-ol, however this compound was not used in the Arena Tests.

Example 1 further identified:
c. 4-Oxo-(E)-2-hexenal, and
d. 4-Oxo-(E)-2-octenal.

Although initially intended for use in Arena test, it was quickly found that baits (formulated using 3 wt % methylcellulose) containing these compounds started to break down immediately at room temperature. Because of this, and because these compounds are only found in nymphs and failed to show any attractive effect in initial Arena tests (showing values equal or lower than the controls), they were not further studied in the arena tests.

As regards g, this compound was identified in low amounts in Example 1. It was however included in the Arena tests in order to test at least one compound from the group of compounds that were found in the headspace and enfleurage samples in concentrations lower than 5 times the concentration in the control.

Carriers

For initial experiments, with the aim of finding an attractive combination of the test compounds, two types of gelatine were used as carriers for the compounds to form baits Gelatine baits and corresponding controls were presented in small caps with about 0.8 ml gelatine in each. Gelatine baits contained either 100 mg/l (10-4) or 10 mg/l (10-5) of each of the one or more test compounds tested in the arena tests.

Initial tests, see tables 2 and 3 in the results section, were prepared by dissolving the test compounds in demineralized water and mixing it with a cooled solution (80% of total volume) of gelatine (acid bone gelatine Bloom 250, 3% by weight) dissolved in demineralized water. The baiting chemicals and optionally the anti-oxidant ascorbic acid were dissolved in 20% of the total volume of water used.

The gelatine was dissolved in water by heating it to around 40° C. under constant stirring. When all gelatine flakes/granules were dissolved the suspension was cooled to 20° C. and the test compounds, with or without an antioxidant, were added.

Immediately after, the gelatinous solution was pipetted into vials and sealed/closed. For controls similar solutions were prepared containing water and gelatine with or without ascorbic acid.

As regards ascorbic acid, this anti-oxidant was included in some baits, however it was found that it instead degraded the baits and resulted in lower efficiency of the baits. The inclusion of ascorbic acid was thus subsequently discontinued.

Later tests, see table 4 and 5 in the results section, were prepared using Tørsleffs gelatine, commercially available gelatine for consumer home use, due to unexpected unavailability of the gelatine used for the initial tests. These baits were prepared by dissolving the solid compound e in the liquid compounds a, b, f and g and adding 20% of the total volume of water to this solution whereafter it was mixed with a cooled 2% by weight Tørsleffs gelatine solution. The solution was poured into gastight alufoil tubes and stored in the refrigerator until usage.

Superabsorbent baits, see table 6 and 7 in the results section, were prepared by dissolving the test compounds in demineralized water and mixing it with a superabsorbent, 0.5% by weight, dissolved in demineralized water. The superabsorbent was obtained from a libero diaper. The test compounds were dissolved in 20% of the total volume of water used.

2.2. Study Design

Bed bugs, ten at a time, were introduced in separate vials into the middle of the arena and simultaneously video recording was started. The test room was lighted with red light and at a late state with infra red light. The bed bugs were followed for 30 minutes. At the end of the 30 minutes experimental period, the number of bed bugs in each container, and beneath or at the rim of the convex glass sheet above each container was scored. The results are referred to as the final distribution of the bed bugs. The final position was not recorded during early experiments.

Each video recording was viewed by an operator and the number of bed bugs entering beneath each glass sheet during the 30 minutes period was counted. It was not possible to keep track of individual bed bugs and the same bed bug could therefore be scored in more than one position and also in the same position more than once if it left and came back. Thus the score of activity during the experiment does not exclude pseudo-replication.

2.3. Statistics

The average visitation to baits and controls, their standard deviation and their 95% confidence interval (CI) were calculated for activity during the experiment and for the final positions of bed bugs when these were recorded. All figures and tables include the 95% confidence interval (CI), which is a conservative measure of membership. Differences in CI indicate a statistically significant difference at the 5% level.

2.4. Results

Table 2 below shows the activity of bed bugs to baits formulated in Tørsleffs gelatine during the 30 minutes of the arena test in four different experiments (Ex. No. 1-4). Table 3 shows the distribution at the end of the experiments for the same baits. Equal amounts of the test compounds were used. The concentration of each test compound was $10^{-4}$, i.e. 100 mg/l.

TABLE 2

Activity of bed bugs - acid bone gelatine baits

| Ex. No. | sex | bait | X ± SD | CI | min | max | N | Sign* |
|---|---|---|---|---|---|---|---|---|
| 1 | female | H2O | 3.8 ± 2.14 | 1 | 2.8 | 4.8 | 20 | a |
| 1 | female | H20 + asc | 3.9 ± 2.59 | 1.21 | 2.7 | 5.1 | 20 | ab |
| 1 | female | abef | 6.3 ± 3.19 | 1.49 | 4.8 | 7.7 | 20 | b |
| 2 | male | H2O | 4.0 ± 2.68 | 1.25 | 2.7 | 5.3 | 20 | a |
| 2 | male | H20 + asc | 5.1 ± 3.16 | 1.48 | 3.6 | 6.6 | 20 | ab |
| 2 | male | abef | 7.2 ± 2.91 | 1.36 | 5.8 | 8.5 | 20 | b |
| 3 | female | H20 + asc | 3.4 ± 1.75 | 0.93 | 2.4 | 4.3 | 16 | a |
| 3 | female | ab | 5.5 ± 2.83 | 1.51 | 4 | 7 | 16 | a |
| 3 | female | ef | 3.4 ± 1.75 | 0.93 | 2.5 | 4.4 | 16 | a |
| 4 | male | H20 + asc | 4.7 ± 2.72 | 1.27 | 3.4 | 5.9 | 20 | a |
| 4 | male | ab | 6.5 ± 4.06 | 1.9 | 4.6 | 8.3 | 20 | a |
| 4 | male | ef | 6.5 ± 3.05 | 1.43 | 5.1 | 7.9 | 20 | a |

*Rows not sharing the same letter (a, b) are significantly different.

TABLE 3

Distribution at end of experiment - acid bone gelatine baits

| Ex. No. | sex | bait | X ± SD | CI | min | max | N | Sign* |
|---|---|---|---|---|---|---|---|---|
| 1 | female | H2O | 2.6 ± 1.76 | 0.82 | 1.7 | 3.4 | 20 | a |
| 1 | female | H20 + asc | 2.0 ± 1.62 | 0.76 | 1.2 | 2.8 | 20 | a |
| 1 | female | abef | 3.5 ± 1.76 | 0.82 | 2.6 | 4.3 | 20 | a |
| 2 | male | H2O | 1.9 ± 1.52 | 0.71 | 1.2 | 2.6 | 20 | a |
| 2 | male | H20 + asc | 2.1 ± 1.37 | 0.64 | 1.5 | 2.7 | 20 | a |
| 2 | male | abef | 2.7 ± 2.35 | 1.1 | 1.6 | 3.7 | 20 | a |
| 3 | female | H20 + asc | 1.7 ± 1.44 | 0.58 | 1.1 | 2.3 | 26 | a |
| 3 | female | ab | 3.5 ± 1.9 | 0.77 | 2.7 | 4.3 | 26 | b |
| 3 | female | ef | 1.5 ± 1.5 | 0.61 | 0.9 | 2.1 | 26 | a |
| 4 | male | H20 + asc | 2.3 ± 1.53 | 0.71 | 1.6 | 3 | 20 | a |
| 4 | male | ab | 2.7 ± 1.66 | 0.78 | 1.9 | 3.4 | 20 | a |
| 4 | male | ef | 2.6 ± 1.67 | 0.78 | 1.8 | 3.4 | 20 | a |

*Rows not sharing the same letter (a, b) are significantly different.

As seen from the tables 2 and 3, the only significant difference in activity of the bed bugs relative to the control (H2O) is seen in experiments 1 and 2 for the bait with the abef combination of test compounds.

For the end distribution of the bed bugs, all of the baits except the ab combination fail to show a significant difference relative to the control.

The of combination failed to provide an attracting effect in these experiments.

For the further experiments the compound g (2-Hexanone) was added to the abef combination to see whether this compound, which was only found in very low concentrations in example 1, would have any effect at all.

Thus table 4 below shows the activity of bed bugs to baits formulated in Tørsleffs gelatine during the 30 minutes of the arena test in four different experiments (Ex. No. 5-8).

Table 5 shows the distribution at the end of the experiments for the same baits.

Equal amounts of the test compounds were used. The concentration of each test compound was $10^{-4}$, i.e. 100 mg/l.

TABLE 4

Activity of bed bugs - Tørsleffs gelatine baits

| Ex. No. | sex | bait | X ± SD | CI | min | max | N | Sign* |
|---|---|---|---|---|---|---|---|---|
| 5 | female | H2O | 3.3 ± 3.2 | 1.50 | 1.80 | 4.80 | 20 | a |
| 5 | female | abef | 4.9 ± 2.94 | 1.37 | 3.53 | 6.27 | 20 | a |
| 5 | female | abefg | 5.0 ± 3.73 | 1.74 | 3.26 | 6.74 | 20 | a |
| 6 | male | H2O | 5.4 ± 3.60 | 1.7 | 3.7 | 7.1 | 20 | a |
| 6 | male | abef | 9.3 ± 6.67 | 3.1 | 6.2 | 12.4 | 20 | ab |
| 6 | male | abefg | 11.5 ± 5.38 | 2.5 | 9.0 | 14.0 | 20 | b |
| 7 | female | H2O | 2.3 ± 2.03 | 0.98 | 1.34 | 3.29 | 19 | a |
| 7 | female | H2O | 2.4 ± 2.29 | 1.11 | 1.32 | 3.53 | 19 | a |
| 7 | female | abefg | 7.5 ± 2.78 | 1.34 | 6.19 | 8.86 | 19 | b |
| 8 | male | H2O | 1.75 ± 1.48 | 0.69 | 1.06 | 2.44 | 20 | a |
| 8 | male | H2O | 2.55 ± 2.39 | 1.12 | 1.43 | 3.67 | 20 | a |
| 8 | male | abefg | 6.4 ± 2.54 | 1.19 | 5.21 | 7.59 | 20 | b |

*Rows not sharing the same letter (a, b) are significantly different.

TABLE 5

Distribution at the end of the experiments - Tørsleffs gelatine baits

| Ex. No. | sex | bait | X ± SD | CI | min | max | N | Sign.* |
|---|---|---|---|---|---|---|---|---|
| 5 | female | H2O | 1.5 ± 1.50 | 0.7 | 0.8 | 2.2 | 20 | a |
| 5 | female | abef | 2.3 ± 2.11 | 1.0 | 1.3 | 3.3 | 20 | ab |
| 5 | female | abefg | 3.1 ± 2.00 | 0.9 | 2.2 | 4.0 | 20 | b |
| 6 | male | H2O | 1.45 ± 1.76 | 0.8 | 0.6 | 2.3 | 20 | a |
| 6 | male | abef | 1.8 ± 1.96 | 0.9 | 0.9 | 2.7 | 20 | a |
| 6 | male | abefg | 4.7 ± 2.54 | 1.2 | 3.5 | 5.8 | 20 | b |
| 7 | female | H2O | 1.0 ± 1.07 | 0.49 | 0.56 | 1.54 | 21 | a |
| 7 | female | H2O | 1.6 ± 2.11 | 0.96 | 0.66 | 2.58 | 21 | a |
| 7 | female | abefg | 6.0 ± 2.21 | 1.01 | 4.99 | 7.01 | 21 | b |
| 8 | male | H2O | 1.1 ± 1.17 | 0.55 | 0.55 | 1.65 | 20 | a |
| 8 | male | H2O | 1.4 ± 1.39 | 0.65 | 0.75 | 2.05 | 20 | a |
| 8 | male | abefg | 5.2 ± 2.4 | 1.12 | 4.08 | 6.32 | 20 | b |

*Rows not sharing the same letter (a, b) are significantly different.

As seen from table 4 and 5 the bed bugs visited the baits with abefg, i.e. the five compounds of the composition according to the first aspect of the present invention, more times than the other baits and controls.

Thus, surprisingly, the addition of test compound g (2-Hexanone) had a strong effect on the attractiveness of the bait despite this compound only being found in low concentration in example 1.

Whereas the combination of test compounds abefg only yielded statistically significant differences in activity, relative to the control, (table 4) for experiments 6, 7 and 8, it is noted that a statistically significant difference relative to the control was observed in all experiments 5-8 at the end of the experiments (table 5)

As regards the difference between the abefg combination and the abef combination, it is noted that in none of the experiments in table 4 and 5 does the abef combination show a significant difference from the control.

Further tests were thus made using the abefg combination of test compounds to show that this combination could be formulated also in other carriers.

Table 6 and 7 show the results for baits using a superabsorbent as carrier.

Equal amounts of the test compounds were used. The concentration of each test compound was $10^{-4}$, i.e. 100 mg/l.

TABLE 6

Activity during experiment - superabsorbent

| Ex. No. | sex | bait | X ± SD | CI | min | max | N | Sign* |
|---|---|---|---|---|---|---|---|---|
| 9 | female | H2O | 2.9 ± 2.13 | 1 | 1.9 | 3.8 | 20 | ac |
| 9 | female | H2O | 2.6 ± 2.11 | 0.99 | 1.6 | 3.6 | 20 | ab |
| 9 | female | abefg | 4.7 ± 1.98 | 0.93 | 3.7 | 5.7 | 20 | c |
| 10 | male | H2O | 2.3 ± 1.69 | 0.79 | 1.5 | 3.1 | 20 | a |
| 10 | male | H2O | 2.0 ± 1.88 | 0.88 | 1.1 | 2.8 | 20 | a |
| 10 | male | abefg | 5.9 ± 2.16 | 1.01 | 4.8 | 6.9 | 20 | b |

*Rows not sharing the same letter (a, b, c) are significantly different.

TABLE 7

Distribution at end of experiment - superabsorbent

| Ex. No. | sex | bait | X ± SD | CI | min | max | N | Sign* |
|---|---|---|---|---|---|---|---|---|
| 9 | female | H2O | 1.6 ± 1.35 | 0.63 | 1 | 2.2 | 20 | a |
| 9 | female | H2O | 1.6 ± 1.57 | 0.73 | 0.9 | 2.3 | 20 | a |
| 9 | female | abefg | 3.0 ± 1.49 | 0.7 | 2.3 | 3.7 | 20 | b |
| 10 | male | H2O | 1.3 ± 1.13 | 0.53 | 0.8 | 1.8 | 20 | a |
| 10 | male | H2O | 1.0 ± 1.34 | 0.63 | 0.4 | 1.6 | 20 | a |
| 10 | male | abefg | 4.6 ± 2.37 | 1.11 | 3.5 | 5.7 | 20 | b |

*Rows not sharing the same letter (a, b) are significantly different.

As seen in tables 6 and 7 the abefg combination of test compounds was provided a significant effect, in relation to the control, in attracting bed bugs, also when the superabsorbent was used as carrier.

In summary of the results in tables 4-7 it is worth noting that the abefg combination of test compounds represents a statistically significant attractant, relative to the control, towards both male and female bed bugs.

EXAMPLE 2bis

Additional Subtractive Tests

To test any effect of adding the two acids,(E)-2-hexenoic acid (e) and 2-octenoic acid (f), to the first three base chemicals (abg) of the bait composition subtractive tests were made. Bed bug baits/lures were prepared at 100 mg/l of each of the compounds in the following combinations: abg, abeg, abfg and in arenas the attractiveness to bed bugs of these blends were tested.

The baits/lures were prepared as previous in a 2% solution of Törsleffs gelatine and each combination was tested against 2 control samples of a gelatine solution without chemicals.

In these additional tests the final positions of bed bugs at the end of each 30 minutes test was observed. Each test of the above combinations were replicated 20 times and each test included either ten female or ten male bed bugs.

Statistics: A two way generalized linear model (GLM) with poisson-distributed count data was calculated with the number of bed bugs attracted to a bait as the dependent variable and with scent/bait and sex as factors. Both factors, sex and scent, were statistically significant (see results) and to explore the data further GLM was performed for each sex separately with scent/bait as the dependent variable.

In total 162 rows of data was used in the analysis: 82 rows relating to females and 80 relating to males. 42 rows related to the combination abefg, and 40 rows each for the remaining combinations abeg, abfg, and abg.

Results:

The distribution at the end of the experiments is shown in table 5bis below.

Both factors, sex (Wald Chi2(df=1)=8.192, p=0.004) and scent (Wald Chi2(df=3) 10.285, p=0.016) and their interaction (Wald Chi2(df=3)=12.412, p=0.006) are statistically significant.

The effect of scent on females was statistically significant (Wald Chi2 (df=3)=21.133, p<0.000) and the comparison for females of abg to abeg, abfg and abefg revealed a statistically significant difference in attraction to abefg and abg (Wald Chi2 (df=1)=168.095, p=0.008), i.e., between the bait/lure with and without the acids, whereas there were no significant differences between abg and abeg and abfg, Wald Chi2 (df=1)=2.178, p=0.140 and Wald Chi2 (df=1)=0.515, p=0.473, respectively.

For males there were no statistically significant difference in attraction to the four baits (Wald Chi2 (df=3)=1.493, p=0.684), see table 5ter below.

TABLE 5bis

Distribution at the end of the experiments - Tørsleffs gelatine baits

| Ex. No. | sex | bait | X ± SD | N | Sign.* |
|---|---|---|---|---|---|
|  | female | H2O | 1.4 ± 2.19 | 20 | a |
|  | female | H2O | 0.4 ± 0.75 | 20 | a |
|  | female | abg | 4.2 ± 3.15 | 20 | b |
|  | male | H2O | 0.8 ± 0.95 | 20 | a |
|  | male | H2O | 1.2 ± 1.51 | 20 | a |
|  | male | abg | 4.7 ± 2.83 | 20 | b |
|  | female | H2O | 1.2 ± 1.27 | 20 | a |
|  | female | H2O | 1.0 ± 1.10 | 20 | a |
|  | female | abeg | 3.3 ± 2.00 | 20 | b |
|  | male | H2O | 0.7 ± 1.17 | 20 | a |
|  | male | H2O | 0.9 ± 0.91 | 20 | a |
|  | male | abeg | 5.5 ± 2.21 | 20 | b |
|  | female | H2O | 1.0 ± 1.36 | 20 | a |
|  | female | H2O | 1.0 ± 1.57 | 20 | a |
|  | female | abfg | 3.7 ± 2.99 | 20 | b |
|  | male | H2O | 1.0 ± 1.57 | 20 | a |
|  | male | H2O | 1.4 ± 2.06 | 20 | a |
|  | male | abfg | 5.3 ± 2.40 | 20 | b |
| 7 | female | H2O | 1.0 ± 1.07 | 22 | a |
| 7 | female | H2O | 1.6 ± 2.11 | 22 | a |
| 7 | female | abefg | 6.0 ± 2.21 | 22 | b |
| 8 | male | H2O | 1.1 ± 1.17 | 20 | a |
| 8 | male | H2O | 1.4 ± 1.39 | 20 | a |
| 8 | male | abefg | 5.2 ± 2.4 | 20 | b |

*Rows within each example not sharing the same letter (a, b) are significantly different.

TABLE 5ter

Results from generalized linear model

| Parameter | Wald Chi2 | Significance |
|---|---|---|
| Sex (male/female) | 8.192 | 0.004 |
| Scent/bait | 10.285 | 0.016 |
| Sex*scent | 12.412 | 0.006 |
| Scent (female) | 21.133 | 0.000 |
| abefg-abg (female) | 168.095 | 0.008 |
| abeg-abg (female) | 2.178 | 0.140 |

TABLE 5ter-continued

| Results from generalized linear model | | |
|---|---|---|
| Parameter | Wald Chi2 | Significance |
| abfg-abg (female) | 0.515 | 0.473 |
| Scent (male) | 1.493 | 0.684 |

Discussion

Females are overall more attracted to the bait/lure with all five components, see table 5bis and 5ter above, with 30% to 55% more females attracted to the full bait (abefg) than to any of the other combinations. The tests with either one or the other acid (e or f) missing attract females the least. Overall males seem indifferent to the presence of acids, although slightly higher numbers are attracted to any bait containing one or both acids.

The statistically significant larger attraction ($p=0.008$) to the bait/lure containing all five compounds (abefg) with e:(E)-2-hexenoic acid, f:2-octenoic acid, a:(E)-2-hexenal, b:(E)-2-octenal and g:2-hexanone), than to the lure (abg) without (E)-2-hexenoic acid and 2-octenoic acid, support the ability of the acids to attract especially female bed bugs compared to any of the other baits tested.

Conclusion:

The combination (abefg) of (E)-2-hexenal, (E)-2-octenal, 2-hexanone, (E)-2-hexenoic acid and 2-octenoic acid exerts the largest attraction on female bed bugs and almost the largest attraction on males too. The two acids show a clear synergistic effect on the females, but not on males. However, a single pregnant female bed bug is what it takes to found a new population=a new undesired infestation and thus it is desirable to be able to attract female bed bugs over any other bed bugs (males and nymphs). However, the bait/lure abefg is almost as efficient to attract males as it is to attract females. Without the combination of both acids (ef) the efficiency of attraction decreases significantly for females, less so for males.

Example 3

Formulation of PEG Baits

This example describes how the abefg combination of test compounds can be formulated in polyethylene glycol, PEG.

3.1. Material and Methods

PEG baits were prepared with the five chemicals a, b, e, f, and g solved/dispersed in PEG200 (5%) and then mixed into melted PEG4000 (melting temp 68° C.). To achieve a good mixing of PEG200 with the chemicals and PEG4000, PEG200 with the dissolved chemicals was added to a closed container and the melted PEG4000 was added and a forceful stirrer at low speed was used to mix the two solutions for one minute. Immediately after, before the PEG bait solidified, it was poured into an ice cube mould. The mould with PEG baits was cooled down for 10 minutes in a freezer after which the bait cubes, each having a weight of about 3 g were packed into gastight alufoil tubes and stored in the refrigerator.

PEG baits contained either 100, 200 or 300 mg/l of a, b and g, and 100, 200, 300, 500 or 1000 mg/l of e and f.

Example 4

Measurements of Volatiles from Baits

One of the baits used in the Arena test was placed in a container and the dynamic headspace was collected as described in example 1 and analysed using Gas chromatography-Mass spectroscopy (GC-MS).

The proportion of the different compounds in the headspace is shown in table 8.

TABLE 8

| | abefg in 1:1:1:1:1 in gelatine 100 mg/l of each compound | | | | |
|---|---|---|---|---|---|
| AMOUNT nano gram/hour | Sample no. 15: 209-213 | Sample no. 15: 215-219 | Sample no. 15: 245.1-5 | Sample no. 16: 02.1-5 | Sample no. 16. 37-40 |
| (Z)- & (E)-2-Hexenal | 565.6 | 234.6 | 136.3 | 102.2 | 258.3 |
| (E)-Hexenoic acid | 0.2 | 3.1 | 0 | 1.4 | 0.08 |
| (Z)- & (E)-2-octenal | 914.5 | 477.6 | 438.5 | 405.2 | 349.9 |
| (E)-octenoic acid | 0 | 0.8 | 0 | 0 | 0.01 |
| 2-Hexanone | 429.1 | 310.3 | 168.2 | 76.1 | 402.0 |
| SUM ng/h | 1909.4 | 1026.5 | 743.0 | 584.9 | 1010.3 |

Example 5

Mesocosm Tests for Determining Efficiency of Composition for Attracting Bed Bugs In the mesocosm tests the ability of the composition, according to the first aspect of the present invention, to attract bed bugs was tested in a mesocosm, i.e. test environment aiming to better simulate the natural habitat of bed bugs. The mesocosm tests were made with a 2% Tørsleffs gelatine gel comprising the five compounds formulated as in Example 1 above and in proportions of (1:1:1:1:1, conc. $10^{-4}$ of each compound).

5.1 Material and Methods

The mesocosm measured 78×56×18 cm and were housed in an IKEA "SAMLA" 55 litre plastic storage contained with a plastic lid, the lid having a fine mesh covered ventilation hole (8 cm in diameter, four in total) in each corner of the lid. Baits (2.5-3.0 g) were applied in Nattaro Scout-traps, which are traps of the pit-fall type constructed to enable bed bugs to through an opening at the top of a cone shaped enclosure to fall down into the interior of the trap wherefrom they cannot leave. The bait was formulated as a 2% gelatine gel containing 100 mg/l, i.e. $10^{-4}$ g/l of each of the chemicals abefg, and further comprised ascorbic acid as an antioxidant. Control baits without abefg was formulated similarly. The baits and Control baits were produced as described above. Each mesocosm contained two Nattaro Scout traps, one with a scented (abefg) bait and one with an un-scented control bait. The control baited trap accounted for determining the attraction of the trap itself. In addition to the traps, each mesocosm contained alternative hiding places consisting of 2-3 wooden pieces (each approx. 30×5.5×1 cm) and two pieces of clothing of varying colour and size (approx. mean size 15×15 cm). Both the pieces of wood and the clothing had previously been exposed to bed bugs and had traces of faeces and earlier aggregations sites. The pieces of wood and clothing had been heated to approx. 50 degrees or frozen for at least 24 hrs to kill any eggs laid by bed bugs in previous experiments in the mesocosm.

Bed bugs from a London Field Strain (*Cimex lectularius* L.), fed on defibrinated sheep blood were used in all experiments. Bed bugs are mostly nocturnal and we controlled the light cycle (13 hrs light between 8:00-21:00 and 11 hrs dark 21:00-8:00) to approach that of bed bugs normal circadian rhythm. Ten bed bugs, four females and six males, were released simultaneously in each experiment. This sex-ratio was used in the mesocosm because it mirrors a distribution that is close to that found in natural populations and we expect it to promote natural behaviour of the bed bugs.

5.2 Study Design

The bed bugs were released in the middle of the mesocosm, approx. 35-40 cm from both the control and the active Nattaro Scout-trap. The two traps were placed in the diagonal corners separated by approx. 70-80 cm, with wood stocks and pieces of clothing in the middle. Mesocosm experiments were started in the afternoon with Nattaro Scout traps loaded with newly opened gels. The time of introduction and removal of the bed bugs were noted. The number and sex of bed bugs caught in both the control and the active traps were noted at regular intervals or when new bed bugs replaced those already in the mesocosm.

As an approximation of the amounts of volatiles emitted from the baits we measured the amount of liquid that evaporated from the gels during the experiments by weighing the gel loaded traps at start and again each time bed bugs in the mesocosm were replaced by new ones, and at the end of each experiment. After each experiment and before reusing, traps were washed with an unscented detergent and dried.

To evaluate how efficient and for how long time the scent bait was attractive we set up a trial where we used the same bait for six consecutive days. During this period we introduced new bed bugs at three points and at the same time we removed and noted the position and sex of the bed bugs introduced in the prior period. The newly loaded gel containing traps were weighed at the start and again 24, 72 and 144 hours after the start of the experiment. Ten bed bugs were introduced at the same time as the gel loaded traps were weighed and put back into the mesocosm. The first group of ten bed bugs thus was in the mesocosm for 24 hours (newly opened scent bait), the second group for 48 hours (bait 24-72 hours old) and the third group for 72 hours (bait 72-144 hours old).

When evaluating the efficiency of the bait in relation to its age we noticed that female and male bed bugs were caught at different rates. Usinger (1966) reported that under optimal conditions adult bed bugs as well as nymphs start to search for food about one week after their previous blood meal and after feeding, nymphs start to develop into their next stage. However, to avoid substantial complications we did not include nymphs in the present study. Bed bugs used in the experiments that were fed less than 7 days prior to the experiment were regarded as satiated or fed, otherwise they were marked as unfed. This division will be used when searching for differences in behaviour.

5.3. Results

Table 9 shows the distribution of bed bugs in relation to age/length of the baits.

There were no significant differences related to the age of the baits (0-24, 24-72, 72-144 hours) in the distribution of bed bug in active traps, control traps and outside in the mesocosm. The active traps caught statistically significant greater number of bed bugs compared to control traps (Scent-Control difference 0.321, $p<0.001$ *) and a statistically significant greater numbers of bed bugs were found outside in the mesocosm than in either trap type (Outside-Control difference 0.400, $p<0.001$* and Outside-Scent difference 0.079, $p=0.02$*)

TABLE 9

Distribution of bed bugs in relation to length/age of bait

| Period | mean ± S.D. | | |
|---|---|---|---|
| | Scented trap | Control trap | Outside traps |
| 1: (0-24 h) | 3.71 ± 3.11$^a$ | 0.88 ± 1.30$^b$ | 5.42 ± 3.71$^c$ |
| 2: (24-72 h) | 3.75 ± 2.40$^a$ | 1.35 ± 1.71$^b$ | 4.90 ± 3.12$^c$ |
| 3: (72-144 h) | 3.67 ± 2.41$^a$ | 1.21 ± 2.41$^b$ | 5.13 ± 2.86$^c$ |

$^{abc}$Tukey HSD post hoc test for 2-way ANOVA of distribution of bed bugs in relation to bait age. Different letters in each period indicates a statistically significant difference between the positions of bed bugs at the end of that period Thus Table 9 shows that the Scented traps, i.e. the traps containing the composition according to the invention, caught significantly more bed bugs than the control traps. Not all bed bugs were trapped—the majority of the bed bugs stayed outside in the mesocosm.

As shown in table 8 the composition according to the first aspect of the present invention is effective also when used together with a trap.

Table 9 shows the total distribution of the bed bugs, i.e. it does not specify the proportion of males and females that were found in the traps.

As specified above 6 males and 4 females were used for each experiment. Table 10 shows Captures of female and male bed bugs in mesocosm during 0-24, 24-72, ad 72-144 hours. The presence of bed bugs and their sex was scored at three different positions: in Nattaro Scout traps with scented bait, in Nattaro Scout traps with unscented bait (control) and in the mesocosm outside traps.

TABLE 10

Distribution of bed bugs in relation to length/age of bait

| Period | sex | mean ±S.D. | | | N |
|---|---|---|---|---|---|
| | | scented trap | control trap | outside traps | |
| 0-24 | females | 1.71 ± 1.52 | 0.54 ± 0.88 | 1.75 ± 1.70 | 24 |
| 0-24 | males | 2.00 ± 1.89 | 0.33 ± 0.64 | 3.67 ± 2.16 | 24 |
| 24-72 | females | 1.83 ± 1.28 | 0.75 ± 1.00 | 1.42 ± 1.41 | 48 |
| 24-72 | males | 1.92 ± 1.60 | 0.60 ± 0.94 | 3.48 ± 2.05 | 48 |

TABLE 10-continued

Distribution of bed bugs in relation to length/age of bait

| | | mean ±S.D. | | | |
|---|---|---|---|---|---|
| Period | sex | scented trap | control trap | outside traps | N |
| 72-144 | females | 1.58 ± 1.25 | 0.6 ± 0.92 | 1.81 ± 1.27 | 48 |
| 72-144 | males | 2.08 ± 1.64 | 0.60 ± 1.27 | 3.31 ± 1.94 | 48 |

When divided by sex, both female and male bed bugs are significantly more prone to get caught in the scented Nattaro Scout-traps compared to the control traps in all the three age groups.

Accordingly the composition according to the first aspect of the present invention is effective for attracting both male and female bed bugs. This is important as it increases the chance of attracting a bed bug, be it male or female, and thereby allowing the detection of the presence of bed bugs regardless of sex.

To asses the effect of the fed/unfed state of bed bugs, the positions at the end of each experiment was compared for fed and unfed male and female bed bugs and presented in tables 11-13 below:

TABLE 11

Comparison between mean and standard deviation of positions at the end of each experiment with new scent for fed and unfed female and male bed bugs, where $N_{Fed} = 32$ and $N_{UnFed} = 16$ for both sexes.

| Position | Sex | Fed/Unfed Bed Bugs | Mean (Proportion) | Std. dev. |
|---|---|---|---|---|
| Control | Female | Unfed | 0.688 (17.2%) | 0.946 |
| Control | Female | Fed | 0.719 (18.0%) | 0.958 |
| Outside | Female | Unfed | 1.188 (29.7%) | 1.601 |
| Outside | Female | Fed | 1.563 (39.1%) | 1.294 |
| Scent | Female | Unfed | 2.125 (53.1%) | 1.544 |
| Scent | Female | Fed | 1.750 (43.8%) | 1.270 |
| Control | Male | Unfed | 0.500 (8.3%) | 0.730 |
| Control | Male | Fed | 0.313 (5.2%) | 0.592 |
| Outside | Male | Unfed | 2.875 (47.9%) | 2.156 |
| Outside | Male | Fed | 3.094 (51.6%) | 1.907 |
| Scent | Male | Unfed | 2.625 (43.8%) | 1.928 |
| Scent | Male | Fed | 2.594 (43.2%) | 1.739 |

TABLE 12

Comparison between mean and standard deviation of positions at the end of each experiment with 1-day-old scent for fed and unfed female and male bed bugs, where $N_{Fed} = 16$ and $N_{Unfed} = 32$ for both sexes.

| Position | Sex | Fed/Unfed Bed Bugs | Mean (Proportion) | Std. dev. |
|---|---|---|---|---|
| Control | Female | Unfed | 0.813 (20.3%) | 1.091 |
| Control | Female | Fed | 0.625 (15.6%) | 0.806 |
| Outside | Female | Unfed | 1.188 (29.7%) | 1.401 |
| Outside | Female | Fed | 1.875 (46.9%) | 1.360 |
| Scent | Female | Unfed | 2.000 (50.0%) | 1.344 |
| Scent | Female | Fed | 1.500 (37.5%) | 1.095 |
| Control | Male | Unfed | 0.813 (13.6%) | 1.061 |
| Control | Male | Fed | 0.188 (3.1%) | 0.403 |
| Outside | Male | Unfed | 2.688 (44.8%) | 2.039 |
| Outside | Male | Fed | 5.063 (84.4%) | 0.772 |
| Scent | Male | Unfed | 2.500 (41.7%) | 1.586 |
| Scent | Male | Fed | 0.750 (12.5%) | 0.775 |

TABLE 13

Comparison between mean and standard deviation of positions at the end of each experiment with 3-days-old scent for fed and unfed female and male bed bugs, where $N_{Fed} = 16$ and $N_{Unfed} =$ for both sexes.

| Position | Sex | Fed/Unfed Bed Bugs | Mean (Proportion) | Std. dev. |
|---|---|---|---|---|
| Control | Female | Unfed | 0.656 (16.4%) | 1.035 |
| Control | Female | Fed | 0.500 (12.5%) | 0.632 |
| Outside | Female | Unfed | 1.531 (38.3%) | 1.218 |
| Outside | Female | Fed | 2.375 (59.4%) | 1.204 |
| Scent | Female | Unfed | 1.813 (45.3%) | 1.256 |
| Scent | Female | Fed | 1.125 (28.1%) | 1.147 |
| Control | Male | Unfed | 0.906 (15.1%) | 1.467 |
| Control | Male | Fed | 0.000 (0.0%) | 0.000 |
| Outside | Male | Unfed | 2.688 (44.8%) | 1.857 |
| Outside | Male | Fed | 4.563 (76.1%) | 1.459 |
| Scent | Male | Unfed | 2.406 (40.1%) | 1.643 |
| Scent | Male | Fed | 1.438 (24.0%) | 1.459 |

In the experiments with the abefg composition (scent) there were no added effects whether the female or male bed bugs where fed or not on the already established effect of the scented Nattaro Scout. Thus, statistically, the composition according to the first aspect of the present invention is equally capable of attracting both fed and unfed bed bugs. This is important as it allows the use of the composition for detection of bed bugs also in locales where the food source, i.e. humans, have moved out. Thus the composition can be used to detect any remaining bed bugs after an extermination effort, for example where a local or room/apartment/house has been uninhabited for some time as the exterminations effort were ongoing. In that case any remaining bed bugs most probably would not have had the chance of feeding for several days, and accordingly it is important that the composition is capable of attracting both fed and un-fed bed bugs.

Although there is no significant result, when reviewing the mean proportions from the new scent the unfed females is the group most likely to get caught in both the active Nattaro Scout trap and the control trap as mean proportions were $females_{fed-scent}=43.8\%$, $females_{unfed-scent}=53.1\%$, $males_{fed-scent}=43.2$ $males_{unfed-scent}=43.8\%$, $females_{fed-control}=18.0\%$, $females_{unfed-control}=17.2\%$, $males_{fed-control}=5.2\%$ and $males_{unfed-control}=8.3\%$ (Table 11). These results are also found in both the 1-day-old scent and the 3-days-old scent experiments were mean proportions for 1-day-old active Nattaro Scout were $females_{fed-scent}=37.5\%$, $females_{unfed-scent}=50.0\%$, $males_{fed-scent}=12.5\%$, $males_{unfed-scent}=41.7\%$, $females_{fed-control}15.6\%$, $females_{unfed-control}=20.3\%$, $males_{fed-control}=3.1\%$ and $males_{unfed-control}=13.6\%$ (Table 12) and mean proportions for 3-days-old active Nattaro Scout were $females_{fed-scent}=28.1\%$, $females_{unfed-scent}=45.3\%$, $males_{fed-scent}=24.0\%$, $males_{unfed-scent}=40.1\%$, $females_{fed-control}=12.5\%$, $females_{unfed-control}=16.4\%$, $males_{fed-control}=0.0\%$ and $males_{unfed-control}=15.1\%$ (Table 13).

The effects of fed and unfed bed bugs should however be taken with some consideration as the bed bugs only had or had not been offered the opportunity to feed within 7 days, not every bed bug fed during this opportunity. These results should therefore be viewed as preliminary results.

The rate at which there were at least 1 bed bug found in the trap, for the active Nattaro Scout-trap with new scent was 89.58%±4.41 compared to 54.17%±7.19 for the control, hit-rate in the 1-day-old scent was 91.67%±3.99 compared to the control at 56.25%±7.16 and for the 3-days-old scent the hit-rate was 91.67%±3.99 compared to the control 47.92%±7.21, see table 14 below:

TABLE 14

Scent age, mean hit-rate ± standard deviation, the rate at which at least one of the ten bed bugs was found in each trap. Hit rate is calculated:
$n_{At\ least\ one\ bed\ bug\ found\ in\ scented/control\ trap}/$
N. The hit-rate should not be interpreted alone but compared between active and control traps. The female/male ratio in the mesocosm were 4:6, N = 48.

| Position | Scent age (days) | Hit-rate | Std dev. |
|---|---|---|---|
| Active Nattaro Scout-trap | 0 | 89.58% | 4.41% |
| Control Nattaro Scout-trap | 0 | 54.17% | 7.19% |
| Active Nattaro Scout-trap | 1 | 91.67% | 3.99% |
| Control Nattaro Scout-trap | 1 | 56.25% | 7.16% |
| Active Nattaro Scout-trap | 3 | 91.67% | 3.99% |
| Control Nattaro Scout-trap | 3 | 47.92% | 7.21% |

Table 14 shows that, for all scent ages, the hit rate was significantly higher for the traps with the abefg composition than the control traps.

5.4 Summary

In summary of Example 4 it should be noted that the Nattaro Scout-trap baited with the scented composition abefg according to the first aspect of the present invention (1:1:1:1:1, conc. 100 mg/l, i.e. $10^{-4}$ of each compound) attracts both female and male bed bugs significantly more than a control Nattaro Scout-trap in the mesocosms tests. Only once, that the inventors are aware of, has a synthetic scent mixture been able to attract bed bugs in a controlled mesocosm study (U.S. patent application Ser. No. 15/10,676 to Gries et al), in that case using male bed bugs and newly mixed scent blends. Our results show highly significant results that the scented gelatine mixture attracted both female and male bed bugs to the Nattaro Scout trap in both the 24-72 hour old scent group and the 72-144 hour old scent group better than to the control trap containing only gelatine.

As there are 48 mesocosm replicates in all three scent-age groups with 10 bed bugs in each setup (female/male ratio 6:4), the results must be considered to be very strong evidence that the scented gel-mixture works for attracting bed bugs to the Nattaro Scout trap in a controlled mesocosm setup.

The invention claimed is:

1. A composition for attracting bed bugs, wherein the composition comprises (E)-2-hexenal, (E)-2-hexenoic acid, (E)-2-octenal, 2-octenoic acid and 2-hexanone, and the composition further comprises an insecticide and/or one or more carriers selected from the group consisting of gelatine, polyethylene glycol (PEG), a superabsorbent polymer, mineral oil, paraffin, and water.

2. The composition according to claim 1, wherein the composition comprises 1 part (E)-2-hexenal, 2 to 5 parts (E)-2-hexenoic acid, 1 part (E)-2-octenal, 1 to 10 parts 2-octenoic acid and 1 part 2-hexanone.

3. The composition according to claim 1, wherein the composition comprises no other volatile components than (E)-2-hexenal, (E)-2-hexenoic acid, (E)-2-octenal, 2-octenoic acid and 2-hexanone.

4. The composition according to claim 1, wherein the composition further comprises the carrier.

5. The composition according to claim 1, wherein the composition comprises the carrier and the insecticide.

6. The composition according to claim 4, wherein the carrier comprises PEG 4000.

7. The composition according to claim 1, wherein the composition comprises 100-300 mg/1 (E)-2-hexenal, 100-1500 mg/1 (E)-2-hexenoic acid, 100-300 mg/1 (E)-2-octenal, 100-3000 mg/1 2-octenoic acid, and 100-300 mg/1 2-hexanone, based on the total volume of the composition.

8. The composition according to claim 1, wherein a dose of the composition comprises 0.1 to 100 g of the composition, or alternatively, wherein a dose of the composition comprises 0.1 to 100 ml of the composition.

9. The composition according to claim 1, wherein the volatiles given off by the composition at a temperature of 20° C. and at a standard atmospheric pressure of 101.3 kPa comprises 0.001 to 37.4% (E)-2-hexenal, 0.01 to 2.2% (E)-2-hexenoic acid, 40.4 to 90.9% (E)-2-octenal, 0.001 to 2.8% 2-octenoic acid and 5.9 to 39.8% 2-hexanone, wherein the sum of the percentages is less than, or equal to, 100%.

10. The composition according to claim 1, wherein the composition comprises the insecticide.

11. A trap for catching bed bugs, wherein the trap comprises the composition according to claim 1.

12. A method of attracting bed bugs, comprising positioning the composition of claim 1 in a locale where bed bugs are present.

13. The method according to claim 12, wherein the composition is contained in a trap.

14. A method of detecting bed bugs, comprising positioning the composition of claim 1 in a locale where bed bugs are suspected of being present.

15. The method according to claim 14, wherein the composition is contained in a trap.

16. The composition according to claim 4, wherein the carrier comprises sodium polyacrylate.

17. The composition according to claim 1, wherein a dose of the composition comprises 0.5 to 10 g of the composition.

18. The composition according to claim 1, wherein a dose of the composition comprises 0.5 to 3.5 g of the composition.

19. The composition according to claim 1, wherein a dose of the composition comprises 0.5 to 10 ml of the composition.

20. The composition according to claim 1, wherein a dose of the composition comprises 0.5 to 3.5 ml of the composition.

* * * * *

UNITED STATES PATENT AND TRADEMARK OFFICE
CERTIFICATE OF CORRECTION

PATENT NO. : 11,013,233 B2
APPLICATION NO. : 16/468263
DATED : May 25, 2021
INVENTOR(S) : Jette Knudsen et al.

Page 1 of 1

It is certified that error appears in the above-identified patent and that said Letters Patent is hereby corrected as shown below:

In the Specification

At Column 13, Line 66, "of" should read -- ef --

In the Claims

In Claim 4, Line 10, "composition further comprises the carrier" should read -- composition comprises the carrier --

In Claim 7, Line 18, "100-3000 mg/l2-octenoic acid" should read -- 100-3000 mg/l 2-octenoic acid --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*